United States Patent [19]

Kobayashi

[11] 4,408,714

[45] Oct. 11, 1983

[54] HEATING APPARATUS FOR MOTOR VEHICLES

[75] Inventor: Shigeru Kobayashi, Yokohama, Japan

[73] Assignee: Nissan Motor Company, Ltd., Yokohama, Japan

[21] Appl. No.: 349,843

[22] Filed: Feb. 18, 1982

[30] Foreign Application Priority Data

Feb. 27, 1981 [JP] Japan .................................. 56-26998

[51] Int. Cl.³ .............................................. B60H 1/02
[52] U.S. Cl. ................................. 237/12.3 C; 98/2.05; 236/13
[58] Field of Search ............... 237/12.3 A; 98/2, 2.05; 236/12, 13

[56] References Cited

U.S. PATENT DOCUMENTS 2,017,525 10/1935 Brennan ......................... 237/12.3 A
4,289,195 9/1981 Bellot et al. ................... 237/12.3 A

*Primary Examiner*—Albert J. Makay
*Assistant Examiner*—Henry Bennett
*Attorney, Agent, or Firm*—Schwartz, Jeffery, Schwaab, Mack, Blumenthal & Koch

[57] ABSTRACT

In a heating apparatus for motor vehicles, there is provided means for permitting part of air just heated by heater means provided in the apparatus to be directed toward a region upstream of the heater means so as to be again heated by the heater means, thereby causing the temperature in the vehicle chamber to be rapidly elevated, while at the same time preventing the humidity therein from being increased.

5 Claims, 4 Drawing Figures

HEATING APPARATUS FOR MOTOR VEHICLES

BACKGROUND OF THE INVENTION

1. Field of the Invention

The present invention relates to a heating apparatus for motor vehicles, and more particularly it pertains to such a heating apparatus wherein engine cooling water is employed as a heat source.

2. Description of the Prior Art

In order to have a better understanding of the present invention, description will first be made of a prior-art heating apparatus for motor vehicles with reference to FIGS. 1 and 2, which includes a casing 1 defining an air flow passage 2. At one end of the air flow passage 2, there are provided ports 4 and 3 which are adapted for taking in air from the vehicle compartment of the motor vehicle and air from outside the motor vehicle, respectively, and at the other end thereof, there are provided air outlet ports 5 which are opened to the compartment. Just for the sake of description, hereinafter, air to be taken in from outside the motor vehicle through the port 3 will be called "outside air", and air to be taken in from the vehicle compartment through the port 4 will be referred to as "inside air". Provided in the air flow passage 2 adjacent to the ports 3 and 4 is an air intake door 6 which is arranged to selectively assume a position to open the port 3 and close the port 4 for permitting outside air to be introduced into the air flow passage 2 through the port 3; a position to close the port 3 and open the port 4 for permitting inside air to be introduced into the air flow passage 2 through the port 4; and a position to open both of the ports 3 and 4 for permitting outside air and inside air to be introduced into the air flow passage 2 through the ports 3 and 4 respectively. In FIG. 2, the port 3 is fully opened while the port 4 is fully closed by the air intake door 6, so that outside air alone is permitted to enter the air flow passage 2 through the port 3. Furthermore, a blower 7 is provided in the air flow passage 2 at a position downstream of the ports 3 and 4, and a heater core 8 through which engine cooling water is passed is also provided therein at a position downstream of the blower 7.

As will be appreciated, with the foregoing conventional apparatus, outside air, inside air or a mixture thereof can be selectively admitted to the air flow passage 2 by operating the blower 7 with the air intake door 6 being set to assume the corresponding one of the aforementioned three positions, and the air thus admitted is passed to be heated to a desired temperature by the heater core. The heated air is blown out into the vehicle compartment.

To rapidly elevate the temperature in the vehicle compartment, the air intake door 6 is set to assume either the position for permitting inside air alone to be admitted to the air flow passage 2 or the position for enabling a mixture of inside air and outside air to be introduced thereinto. By so doing, air warmer than outside air is further heated by the heater core 8 and then blown out into the vehicle compartment from the air outlet ports 5. In this way, rapid elevation of the temperature in the vehicle compartment can be achieved.

However, the above-described prior-art apparatus has the following disadvantage: in such conventional apparatus, air introduced, for circulation, into the passage 2 through the port 4 comprises inside air, i.e., the air in the vehicle compartment which has been blown out thereinto from the heating apparatus, and hence the air thus introduced is at a lower temperature than that of the air just blown out. Thus, with the foregoing apparatus, the temperature of air to be blown out through port 5 can only be elevated to a limited degree. Thus, in case it is desired to rapidly warm up the interior of the vehicle compartment, it is required that the quantity of air to be introduced into the air flow passage 2 be increased to thereby cause the temperature in the vehicle compartment to be rapidly elevated. In such a case, however, another difficulty will be encountered, if it is attempted to meet the aforementioned requirement, in that the humidity of air blown out of the heating apparatus will be increased since the humidity in the vehicle compartment has been increased by the breathing and/or sweating of the passenger or passengers. The increased humidity tends to fog up glass members such as windshield.

SUMMARY OF THE INVENTION

Accordingly, it is an object of the present invention to provide novel and improved heating apparatus for motor vehicles, which is so designed as to obviate the aforementioned problems with prior art.

Briefly stated, according to an aspect of the present invention, there is provided a heating apparatus for motor vehicles, which includes means for enabling air, which has a temperature high enough to achieve rapid elevation of the temperature in the vehicle compartment of a motor vehicle without substantially increasing the quantity of air to be introduced from the vehicle compartment into an air flow passage having a heater core disposed therein, thereby effectively preventing glass members such as wind shield and the like of the motor compartment from becoming misted.

Other objects, features and advantages of the present invention will become apparent from the ensuing description taken in conjunction with the accompanying drawings.

DESCRIPTION OF THE PREFERRED EMBODIMENTS

Figure 1:
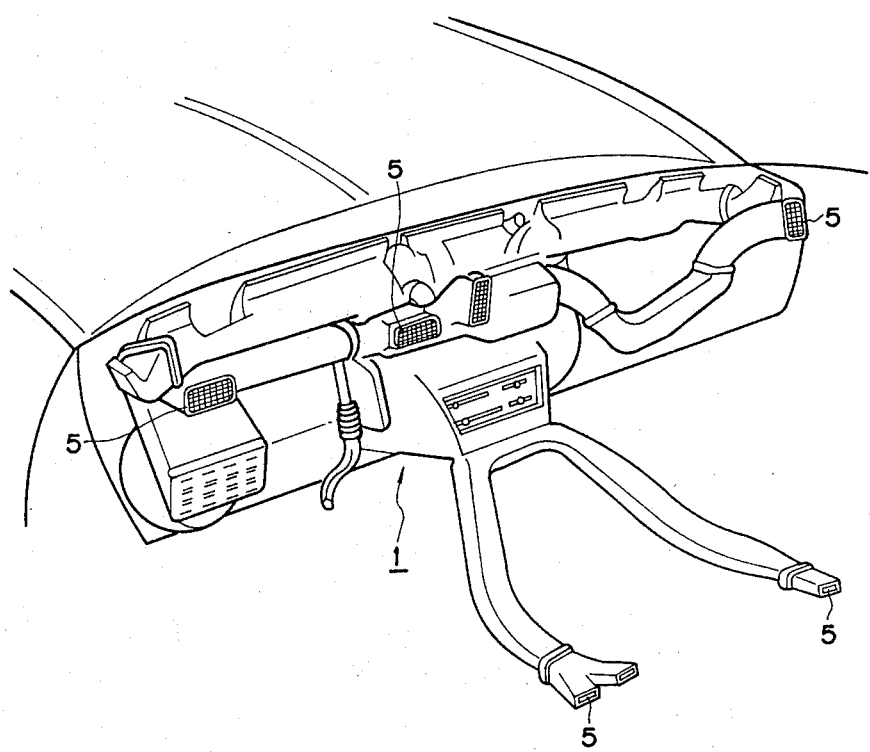
FIG. 1 is a fragmentary perspective view of the front panel portion of a motor vehicle, illustrating the portion where a heating apparatus is disposed.
Figure 2:
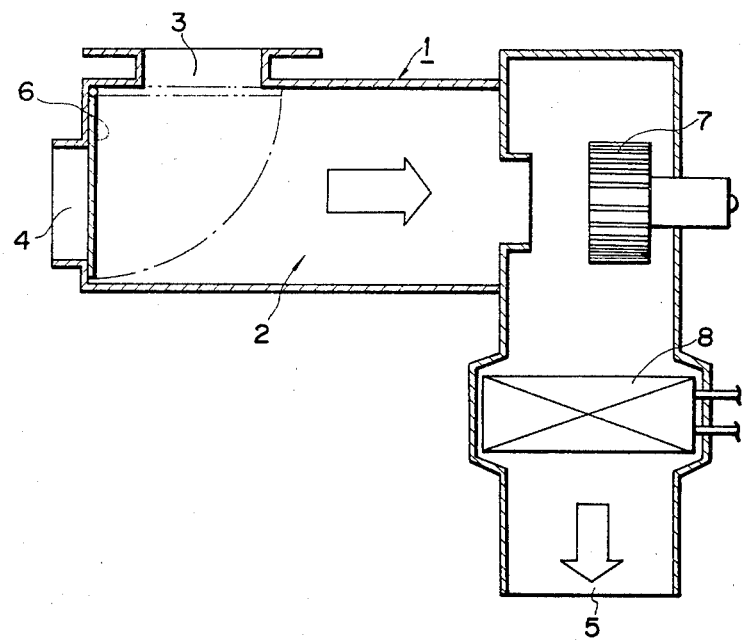
FIG. 2 is a schematic sectional view showing a prior-art heating apparatus for motor vehicles.
Figure 3:
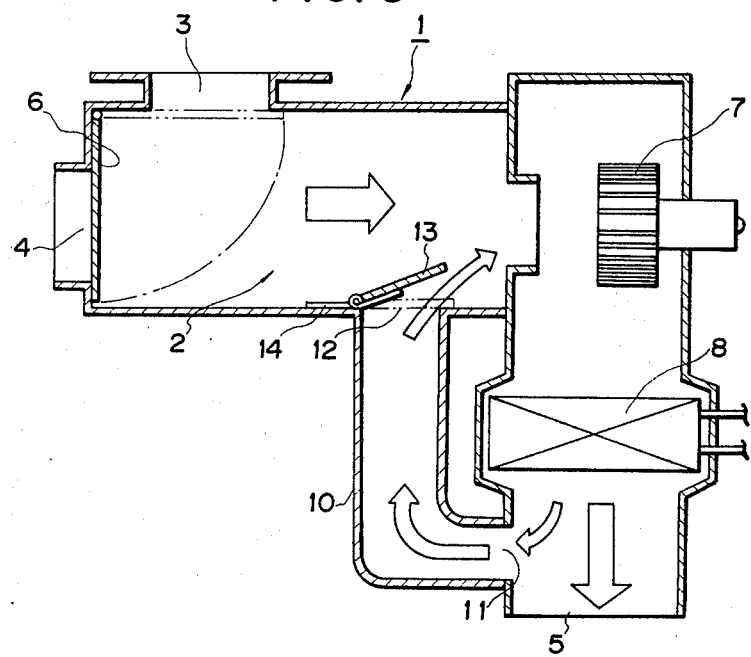
FIG. 3 is a schematic sectional view showing the heating apparatus for motor vehicles according to an embodiment of the present invention.

Referring now to FIG. 3, there is shown the heating apparatus for motor vehicles according to a first embodiment of the present invention, which includes an air flow passage 2 defined in a casing 1, an air intake door 6 provided in the air intake portion of the air flow passage 2, a blower 7 provided in the air flow passage 2, and a heater core 8 through which engine cooling water is circulated, the heater core 8 being provided in the air flow passage 2 at a position downstream of the blower 7.

According to this embodiment, an air recirculation passage 10 is provided in communication with the air flow passage 2. More specifically, the air recirculation passage 10 has one end thereof communicated with the air flow passage 2 at a position indicated at 11 which is downstream of the heater core 8, the other end of the passage 10 being communicated with the air flow passage 2 at a position indicated at 12 between the position of the air intake door 6 and the position of the blower 7, i.e., at a position upstream of the heater core 8.

Furthermore, a control door 13 is provided in the air flow passage 2 at a position corresponding to the opening 12 of the air recirculation passage 10. The control door 13 is swingably attached to an edge portion of the opening 12 and normally urged by means of a spring member 14 in such a direction as to open the aperture 12. As the flow rate of air introduced into the air flow passage 2 increases, the control door 13 will thereby be urged against the force of the spring member 14 in such a direction as to close the opening 12. In this way, the opening degree of the control door 13 depends on the flow rate or pressure of air introduced into the air flow passage 2. As will be appreciated, the flow rate or pressure of air introduced into the air flow passage 2 through the port 3 will build up as the running speed of the vehicle increases. When the flow rate or pressure of air introduced into the air flow passage 2 is increased beyond a predetermined value as the result of the vehicle running speed having been increased, the control door 13 is urged to fully close the opening 12.

Description will now be made of the operation of the apparatus according to the foregoing embodiment of the present invention. Let it be assumed that the motor vehicle equipped with the present apparatus is running at a relatively low speed, and that the present apparatus is operated with the air intake door 6 set to assume the position for taking in outside air, i.e., air outside the motor vehicle. Then, outside air will be admitted via the port 3 to the air flow passage 2 under the action of the blower 7. As will be appreciated from the foregoing discussion, when the motor vehicle is running at a low speed, the flow rate of pressure of air introduced into the air flow passage 2 through the port 3 is at a relatively low level; thus, the control door 13 is caused to assume an open position under the influence of the spring member 14 so that the air recirculation passage 10 is communicated via the opening 12 with the air flow passage 2. In this way, part of air heated by the heater core 8 is passed through the air recirculation passage 10 to be returned to that portion of the air flow passage 2 which is upstream of the heater core 8; the previously heated air is mixed with the introduced outside air in the air flow passage 2; and then the air mixture, which is at a higher temperature than that of outside air, is passed to be subjected to heat exchange at the heater core 8. Consequently, air of a correspondingly elevated temperature is blown out of the outlet ports 5 into the vehicle compartment.

When it is desired that the temperature of air blown out into the vehicle compartment be further elevated, the air intake door 6 is made to assume the position for permitting both inside air and outside air to be introduced into the air flow passage 2. In this case, too, part of air just heated by the heater core 8 is returned, via the air recirculation passage 10, to that portion of the air flow passage 2 which is upstream of the heater core 8, so that the temperature of air to be blown out into the vehicle compartment can be elevated without appreciably increasing the quantity of inside air to be introduced into the air flow passage 2.

Let it now be assumed that the motor vehicle is running at a high speed, and that the present apparatus is operated with the air intake door 6 made to assume the position for permitting only outside air, i.e., air outside the motor vehicle to be introduced into the air flow passage 2 through the port 3. Generally, when the motor vehicle is running at a high speed, a large quantity of engine cooling water is passed to the heater core 8, and yet the engine cooling water is at a higher temperature. Thus, when the running speed of the motor vehicle is high, a sufficient heat exchange is effected between air in the air flow passage 2 and the heater core 8 so that air heated to a sufficiently high temperature is blown out into the vehicle compartment.

As mentioned above, the opening degree of the control door 13 is decreased as the running speed of the motor vehicle is increased, so that the quantity of heated air to be returned to the air flow passage 2 through the air recirculation passage 10 is decreased when the running speed of the motor vehicle is decreased, the opening degree of the control door 13 is increased, so that the recirculated heated air is increased. Even when the running speed of the motor vehicle is increased, however, the temperature of air to be blown out into the vehicle compartment is prevented from being lowered, by virtue of the fact that the quantity of engine cooling water fed to the heater core 8 as well as the temperature thereof is also increased as mentioned above. This also applies in the case where the running speed of the motor vehicle is increased beyond a given level at which the opening degree of the control door 13 becomes nil so that the opening 12 of the passage 10 is fully closed thereby.

Figure 4:
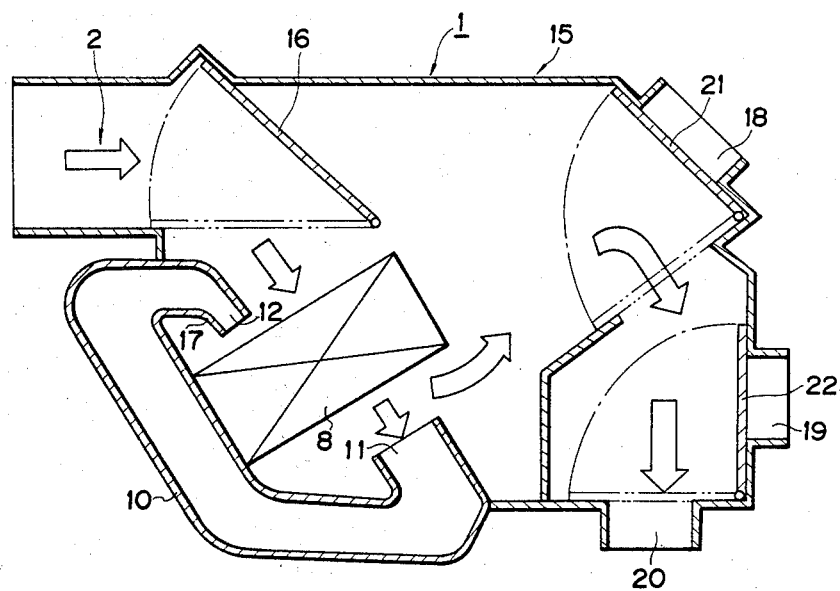
FIG. 4 is a schematic sectional view showing the heating apparatus for motor vehicles according to a second embodiment of the present invention.

Referring to FIG. 4, there is shown the heating apparatus according to a second embodiment of the present invention, wherein a heater unit is indicated at 15, an air mix door is shown at 16, and parts corresponding to those of FIG. 3 are denoted by like reference numerals. As is known in the art, the air mix door 16 is arranged so that air flow in the passage 2 is directed toward the heater core 8 in a proportion depending on the opening degree of the door 16. Although not shown, ports similar to the ports 3 and 4 of FIG. 3 are formed in the air flow passage 2, and a blower similar to the blower 7 of FIG. 3 is also provided.

The heater unit 15 is in communication with the air flow passage 2, and part of air heated by the heater core 8 is returned through the air recirculation passage 10 to that portion of the air flow passage 2 which is upstream of the heater core 8.

According to this embodiment, it is to be noted that one end of the air recirculation passage 10 is opened at a position downstream of the heater core 8 in opposing relationship thereto, as indicated at 11, while the other end thereof is opened at a position upstream of the heater core 8 in opposing relationship thereto. Furthermore, the open end portion 12 of the passage 10 is converged to constitute a convergent nozzle portion 17. Indicated at 18, 19 and 20 are a defroster air outlet, ventilator air outlet and foot air outlet, respectively, and shown at 21 and 22 are doors adapted to effect changeover of the outlets 18, 19 and 20, respectively.

In operation, assuming that the heating apparatus is operated with the air mix door 16 being made to assume the uppermost position, then air in the air flow passage 2 will entirely be directed toward the heater core 8 by means of the blower (not shown), and part of air heated by the heater core 8 will be permitted to flow in the air recirculation passage 10 from the open end 11 thereof. Meanwhile, air will be flowing at a given rate through the air flow passage 2; thus, the air pressure in that portion of the air flow passage 2 which is in the vicinity of the open end 12 of the air recirculation passage 10 turns out to be lower than the air pressure in the air recirculation passage 10. By virtue of this fact, coupled with the fact that the exit end portion 12 of the passage 10 is constructed to form the nozzle portion 17, air in the air recirculation passage 10 will be sucked out toward the heater core 8. That is, air flowing in the air recirculation passage 10 will be introduced into a region upstream of the heater core through the passage 10, and will subsequently be passed to be heated by the heater core 8. The air thus heated will then be mixed with the air in the air flow passage 2, and the resultant air mixture, which is of a relatively high temperature, will be passed to be subjected to heat exchange at the heater core 8. In this way, the temperature of air to be blown out into the vehicle compartment can be elevated without appreciably increasing the quantity of air in the vehicle compartment to be introduced into the air flow passage 2 for circulation.

In any of the foregoing embodiments, even when a blower of an increased capacity is employed so that the quantity of air flowing through the air flow passage 2 is thereby increased, part of air having been passed to the heater core 8 through the recirculation passage 10 can still be always circulated, thereby avoiding the tendency for the temperature of blown-out air to be lowered because of the fact that the quantity of air passing through the air flow passage 2 has been increased as mentioned above. Thus, a blower of a high capacity usually employed with a cooling apparatus may be utilized with the present heating apparatus.

Although, in the foregoing first embodiment shown in FIG. 3, the control door 13 was provided at the outlet opening end 12 of the air recirculation passage 10, it is possible that such a control door may be omitted. Furthermore, although in each of the illustrated embodiments, the present invention has been described as applied to a heating apparatus, it will readily be apparent to those skilled in the art that the present invention is equally applicable to an air conditioner equipped with cooling and heating functions insofar as it is operated to perform the heating function.

As will be appreciated from the foregoing discussion, with the heating apparatus according to the present invention, it is possible to achieve an enhanced heating efficiency since air of an elevated temperature can be blown out into the vehicle compartment by virtue of the arrangement that part of air just heated by the heater core is returned to a region upstream of the heater core through the air recirculation passage communicating with the air flow passage, so as to be again subjected to heat exchange at the heater core. Furthermore, it is also possible to effectively prevent glass members such as the windshield and the like from becoming fogged-up, by virtue of the fact that the necessity for the quantity of inside air circulated through the heating apparatus to be increased as in the prior art is eliminated so that the humidity of the blown-out air can thereby be prevented from being increased.

While specific embodiments of the present invention have been illustrated and described, it is to be understood that the present invention is by no means limited thereto and covers all changes and modifications which will become possible within the scope of appended claims.

What is claimed is:

1. A heating apparatus for motor vehicles, comprising:
    an air flow passage provided with a first and second port which are adapted for taking in air from the vehicle compartment and for taking in air from outside the motor vehicle, respectively;
    an air intake door provided in said air flow passage in proximity to said first and second ports, said air intake door being arranged to selectively assume a first position to close said first port and open said second port for permitting the air taken in from outside the motor vehicles to be introduced into said air flow passage, a second position to open said first port and close said second port for permitting the air taken in from the vehicle compartment to be introduced into said air flow passage, and any intermediate position to open both of said first and second ports for permitting a mixture of the air taken in from outside the motor vehicle and the air taken in from the vehicle compartment to be introduced into said air flow passage;
    a heater core disposed in said air flow passage;
    a blower disposed in said air flow passage; and
    a heated air recirculation passage communicating with said air flow passage at a position upstream of said heater core and at a position downstream thereof, so that part of an air flow passed through and heated by said heater core to be used for heating the vehicle compartment is passed through said recirculation passage to be recirculated to a region upstream of said heater core.

2. A heating apparatus according to claim 1, further comprising means adapted, when said air intake door assumes one of said first and intermediate positions, for controlling the quantity of heated air to be recirculated toward said heater core through said recirculation passage, in response to variations in the air pressure in said air flow passage which tend to be caused as the running speed of the motor vehicle is varied.

3. A heating apparatus according to claim 2, wherein said control means comprises a control door swingably provided in said air flow passage at said position upstream of said heater core where said recirculation passage is communicated with said air flow passage.

4. A heating apparatus according to any of the preceding claims, wherein said recirculation passage has the opposite end portions thereof directed in opposite directions in opposing relationship to said heater core.

5. A heating apparatus according to claim 4, wherein that one of the end portions of said air recirculation passage which is located at the position upstream of said heater means is constructed in the form of a convergent nozzle.

* * * * *